United States Patent [19]

Aidlin et al.

[11] 4,356,907
[45] Nov. 2, 1982

[54] MACHINE FOR DISTRIBUTING GROUPS OF WORKPIECES TO DIFFERENT DESTINATIONS

[76] Inventors: Samuel S. Aidlin, 214 Beaumont St., Brooklyn, N.Y. 11235; Stephen H. Aidlin, 934 Glenwood Rd., West Hempstead, N.Y. 11552

[21] Appl. No.: 259,098

[22] Filed: Apr. 30, 1981

Related U.S. Application Data

[63] Continuation of Ser. No. 877,703, Feb. 14, 1978, abandoned.

[51] Int. Cl.³ .................. B65G 47/26; B65G 47/84; B65G 47/12
[52] U.S. Cl. .................. 198/427; 198/428; 198/451; 198/438; 198/441; 221/68
[58] Field of Search .......... 198/441, 429, 856, 438, 198/427, 451, 428, 558, 859, 366, 372, 524, 389; 209/914, 919, 922; 221/68

[56] References Cited

U.S. PATENT DOCUMENTS 4,164,997 8/1979 Mueller .................. 198/441

Primary Examiner—Robert B. Reeves
Assistant Examiner—Brian Bond
Attorney, Agent, or Firm—Karl F. Ross

[57] ABSTRACT

Elongate workpieces with enlarged heads to be distributed in groups to different destinations, such as plastic parisons to be delivered to respective mold cavities of a four-cavity blow-molding unit, are fed—partly by gravity—over a pair of sloping, counterrotating spindles to a tilted turntable, the spindles being separated by a gap letting the bodies of the workpieces hang down between them. The workpieces are successively inserted into peripheral recesses of the turntable along a raised edge thereof for rotary entrainment to respective guide channels confronting its opposite, depressed peripheral edge. Four workpieces at a time are dislodged from their recesses, after retraction of a barrier, by air jets driving them into the guide channels assigned to them. Fresh workpieces are deposited upon the upstream end of the spindle track by an elevating conveyor controlled by a monitoring device such as a photosensor which stops the conveyor upon detecting a backup of workpieces along the track.

7 Claims, 5 Drawing Figures

MACHINE FOR DISTRIBUTING GROUPS OF WORKPIECES TO DIFFERENT DESTINATIONS

This is a continuation of application Ser. No. 877,703, filed Feb. 14, 1978 now abandoned.

FIELD OF THE INVENTION

Our present invention relates to a machine for distributing workpieces in predetermined groups, e.g. four at a time, to different destinations for further processing.

BACKGROUND OF THE INVENTION

Certain workpieces, such as preformed plastic parisons to be fed to a blow-molding unit, are effectively handled in groups of, say, four parisons to be simultaneously shaped in as many mold cavities. Such a four-cavity blow molder has been described and shown in our prior U.S. Pat. No. 4,132,584, disclosing a system for the manufacture of large plastic bottles by fitting round-bottomed containers—produced by blow molding—with separately molded flat-bottomed base cups.

OBJECTS OF THE INVENTION

The general object of our present invention is to provide an efficient and simple machine for the distribution of predetermined numbers of generally identical workpieces in parallel to their respective destinations.

A more particular object is to provide a machine of this character designed for the handling of workpieces such as plastic parisons having an elongate stem topped by an enlarged head.

SUMMARY OF THE INVENTION

We realize these objects, in conformity with our present invention, by providing a carrier with a multiplicity of lodgments each adapted to receive a workpiece (referred to hereinafter, for convenience, as a parison) to be transferred to its destination, the carrier being intermittently driven for successively aligning these lodgments with a loading point and with a plurality of unloading points remote therefrom. The parisons are sequentially delivered to the loading point by feed means preferably operating in a nonpositive manner, as by gravity and/or friction, allowing the supply to be immediately stopped in the event of a backup as determined by monitoring means such as a photosensor disposed along the feed track. Such a photoelectric monitoring device has also been disclosed in our above-identified prior patent. Upon alignment of loaded lodgments of the carrier with the several unloading points, the parisons are concurrently conveyed to respective transporters extending from these points to their destinations, specifically to mold cavities of a blow-molding unit designed to reshape them into containers such as soft-drink bottles. The parallel transfer of the parisons from the carrier to these transporters is effected by discharge means operatively linked with the drive means for the workpiece carrier so as to become effective only when the carrier has come to a halt after taking the necessary number of steps (four in the case of a four-cavity blow molder). It will be convenient to make the multistep transport cycle of the carrier slightly faster than the operating cycle of the blow-molding unit so that unloading by the discharge means can commence immediately upon the emission of a readiness signal by the blow molder. In a system as described in our prior U.S. Pat. No. 4,132,584, comprising means for assembling the blow-molded containers with their base cups, the aforedescribed unloading and blow-molding operations should of course be synchronized with the assembly procedure.

The transporters, pursuant to another feature of our invention, are advantageously passive guide channels through which the parisons move mainly by gravity, aided by air jets emitted during unloading by nozzles forming part of the discharge means. The nozzles cooperate with a retractable barrier holding the parisons within their lodgments until the blow molder is ready to receive them.

According to a further feature of our invention, the workpiece carrier is a turntable provided with preferably equispaced peripheral recesses constituting the aforementioned lodgments. By tilting the axis of the turntable to elevate its peripheral edge in the vicinity of the feed track with reference to an opposite edge in the region of the transporters, we further utilize the force of gravity in both the loading and the unloading of the recesses.

The parisons here primarily contemplated have slender inflatable stems, designed to form the container body, with threaded noninflatable extensions, constituting the container neck, the stems and their extensions being separated by enlarged collars forming shoulders against which the inflated body comes to rest. We prefer to let these workpieces travel to and from the turntable in an upright, space-saving position, with similar vertical orientation of the mold cavities as shown in our prior patent. For this purpose the guide channels transporting the parisons to the mold cavities can be provided with bottom slots accommodating their stems whereas the feed track leading to the loading point is constituted by a pair of downwardly sloping parallel members separated by a gap of similar width. Advantageously, these track-forming members are a pair of counterrotating spindles or shafts so driven that their rising sides confront each other across the intervening gap; since these rising sides contact the parisons along their stems and shoulders, in a plane transverse to the spindle axes, they impart to them a forward component of motion which together with gravity impels them toward the downstream end of the feed track. Because of this supplemental driving force, the spindle axes may be inclined to the horizontal at a smaller angle than the guide channels leading to the blow-molding unit. The guide surfaces of these channels are preferably coplanar with the supporting surface of the turntable for smooth transfer.

BRIEF DESCRIPTION OF THE DRAWING

The above and other features of our invention will now be described in detail with reference to the accompanying drawing in which.

SPECIFIC DESCRIPTION

Figure 1:
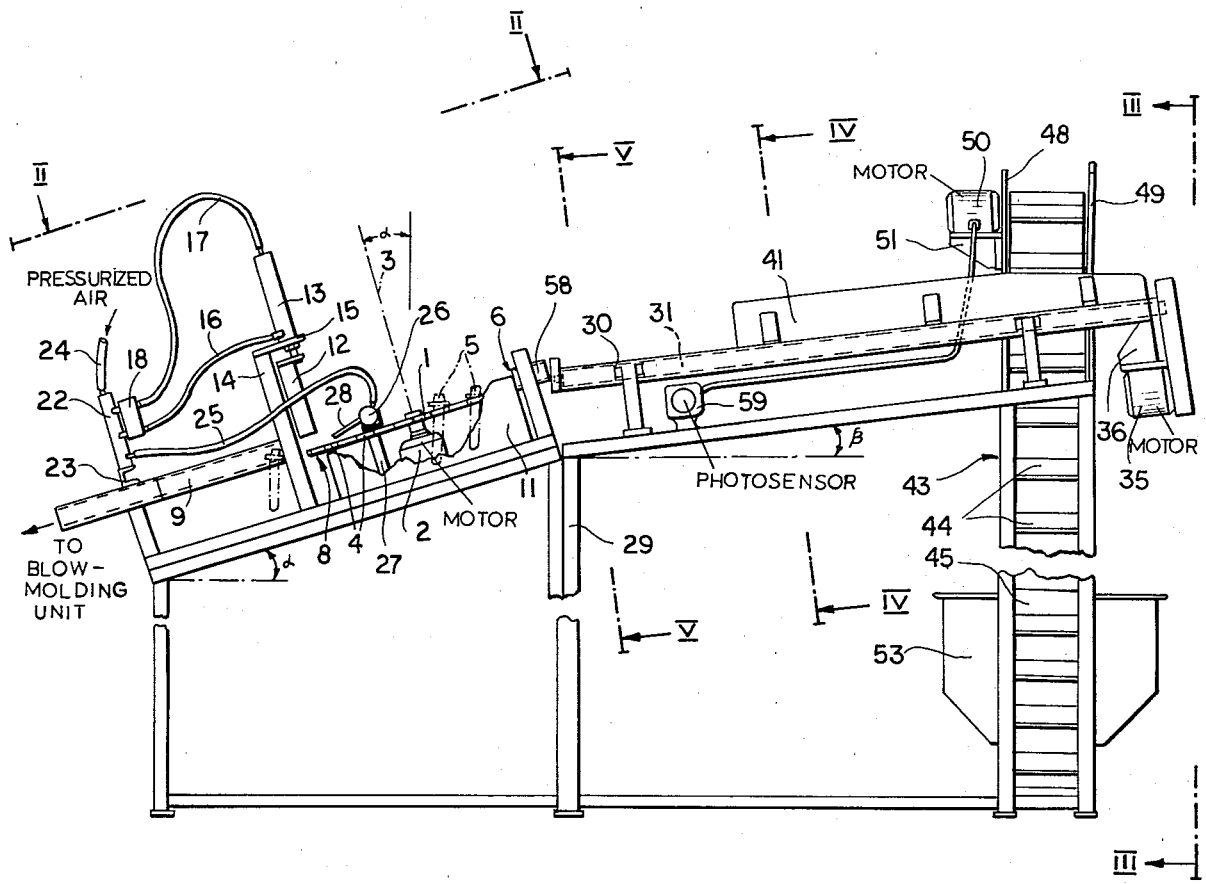
FIG. 1 is a side-elevational view of a workpiece-distributing machine according to our invention.
Figure 2:
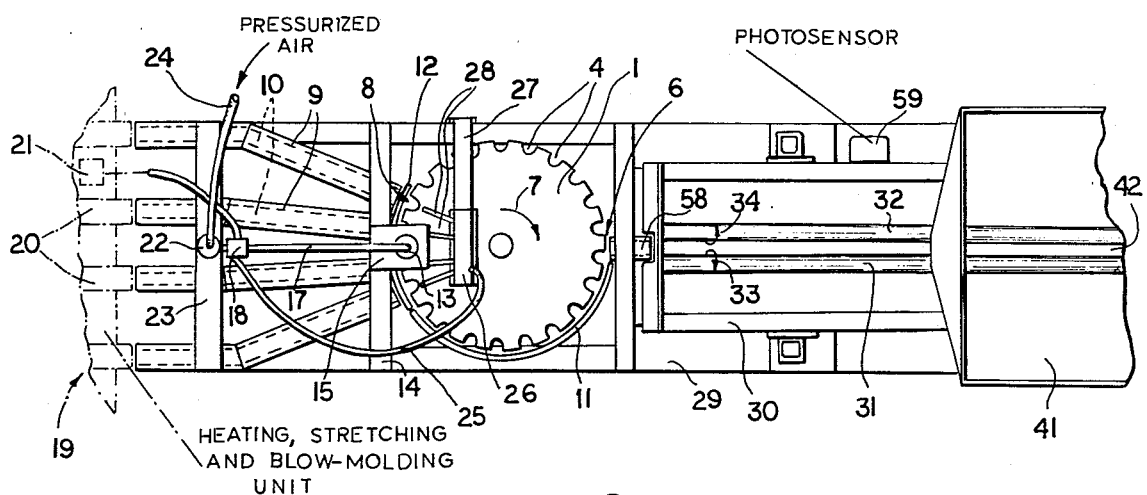
FIG. 2 is a partial top view of the machine as seen on the line II—II of FIG. 1.

In the drawing we have shown a machine for automatically introducing groups of plastic preforms or parisons 5 with elongate bodies or stems 55 into respective mold cavities of a blow-molding unit 19 (FIG. 2). The machine comprises a turntable 1 mounted on a stepping motor 2 for intermittent rotation around a tilted axis 3 including an angle α of about 15° to 20° with the vertical. The turntable is provided with a multiplicity of peripherally equispaced recesses 4 for receiving the workpieces 5 in groups of four at a loading station 6 and entraining them in a clockwise direction, as indicated in FIG. 2 by an arrow 7, to a diametrically opposite unloading station 8 confronting four inclined guide channels 9. The latter, elevated above the ground, are seen to lie substantially in the plane of turntable 1 and are formed as rectangular tubes or C-profiles each with a longitudinal slot 10 in its bottom surface, the slots having a width slightly larger than the diameter of the workpiece bodies 55. The parisons are suspended from the upper turntable surface in a generally upright position, as shown in FIG. 1, and are held in their respective recesses 4 by a retaining wall or rail 11 terminating just ahead of a vertically movable, curved barrier plate 12 which is normally interposed between the unloading station 8 and the adjoining guide channels 9. Barrier 12 can be upwardly withdrawn by a pneumatic jack 13 firmly attached at the top of an upright support 14 to a brace member 15 cantilevered therefrom over turntable 1.

Jack 13 is operated via a pair of air hoses 16, 17 by a solenoid-activated double-throw valve 18 under the control of a switch 21 in blow-molding unit 19, this unit having guide tracks 20 aligned with channels 9 for receiving parisons therefrom and delivering them in an upright position to respective blow-molding cavities (not shown). A first manifold 22, mounted on a transverse spacer bar 23 attached to the top surfaces of channels 9, receives pressurized air by a conduit 24 from an external source not further illustrated for distribution to valve 18 and, via a hose segment 25, to a second manifold 26 mounted on an L-shaped arm 27 above turntable 1. Air under pressure is emitted from manifold 26 through four nozzles 28 each aligned with a respective guide channel 9 at a location radially inward from the depressed peripheral edge of turntable 1.

A base framework 29 supporting the aforementioned structural elements also carries a rectangular mounting frame 30 in which there are journaled a pair of spindles 31, 32 counterrotatingly driven in the directions of arrows 33 and 34 (FIGS. 2, 4 and 5) by a motor 35 suspended by means of a bracket 36 below the upstream end of frame 30. An endless belt 37, partly wound around a deflecting idler roller 38 and in opposite directions around the upper extremities of spindles 31, 32, serves to transmit rotary power from a drive shaft 39 or motor 35 to the spindles, the belt motion being indicated by arrows 40 in FIG. 3.

Figure 3:
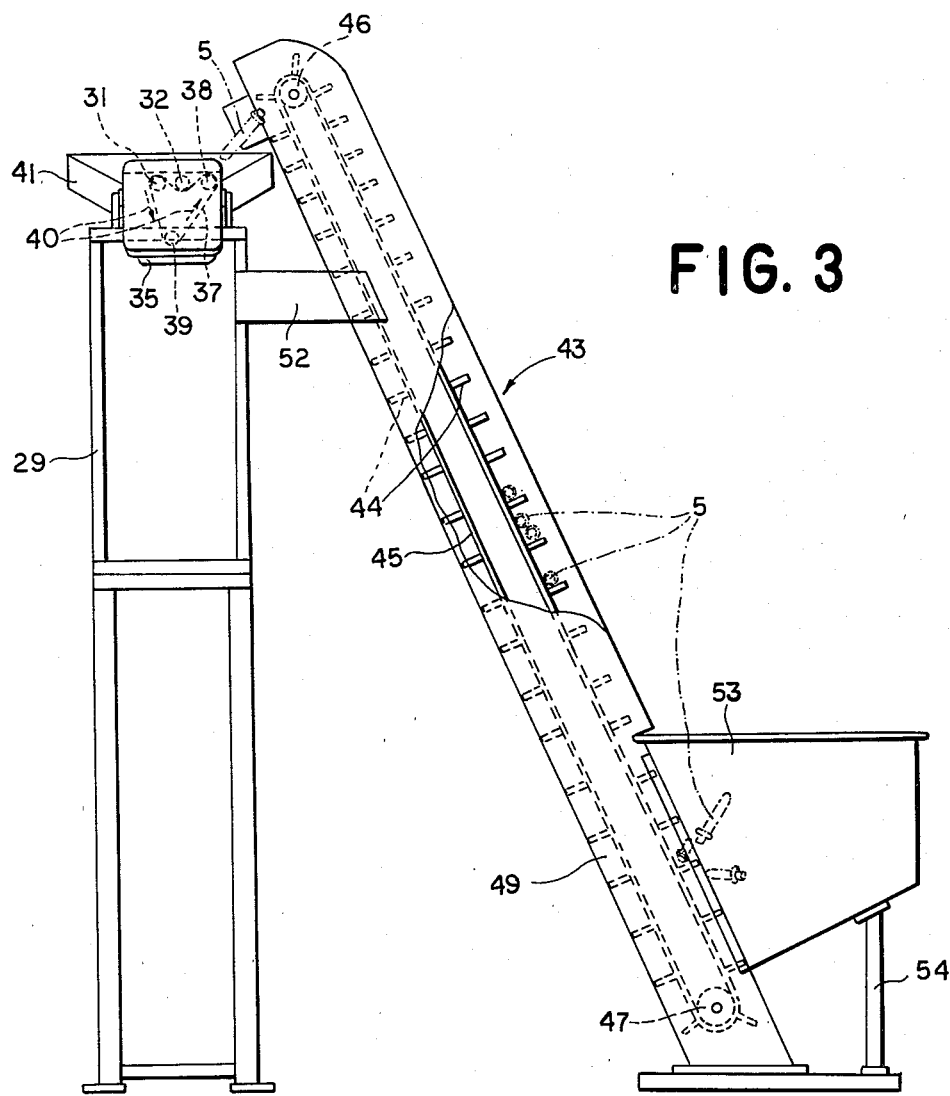
FIG. 3 is an end view of the machine as seen on the line III—III of FIG. 1.

The direction of spindle rotation is so chosen (clockwise for spindle 32 and counterclockwise for spindle 31 as viewed in FIG. 3) that their descending sides lie on the exterior and their confronting ascending sides bound the intervening gap.

Figure 4:
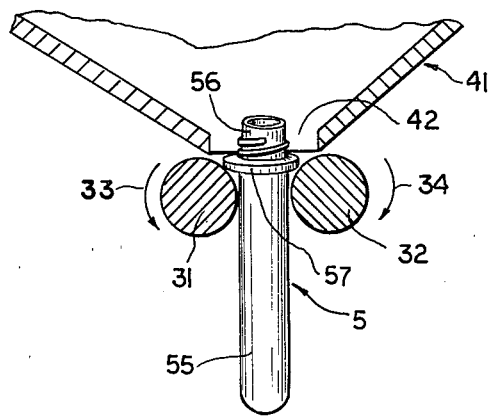

A generally V-shaped hopper 41, seated centrally above spindles 31, 32 on frame 30, is provided in its bottom with an outlet slot 42 large enough to let individual workpieces 5 fall upon the underlying feed track. The gap between the spindles is slightly wider than the body diameter of the parisons lifted into hopper 41 by an elevating conveyor 43 best illustrated in FIG. 3. Conveyor 43 has a multiplicity of rungs 44 attached to an endless belt or chain 45 partially wound around two rollers or sprockets 46, 47 having their shafts journaled in stringers 48, 49, the upper roller 46 being driven by a motor 50 mounted on a bracket 51 rigid with stringer 48. Close to its top, conveyor 43 is anchored to framework 29 by at least one horizontal brace 52; near its bottom it forms one side of a storage bin 53 held above ground by a post 54 and the stringers 48, 49. During operation of the conveyor, rungs 44 pass through bin 53 to collect workpieces 5 therefrom for transportation to hopper 41. The storage bin 53 is continuously or periodically refilled from a nonillustrated source such as an injection-molding machine. After being dumped into hopper 41, the plastic parisons 5 fall through the slot 42 to become substantially vertically oriented by the counterrotating spindles 31, 32. As illustrated in FIG. 4, the stem 55 of each parison 5 has a threaded upward extension 56 separated therefrom by a collar or flange 57 slightly wider than the gap between spindles 31, 32 but smaller than the width of slot 42; thus, stems 55 drop between the spindles while the flanges 57 come to rest thereon. As the spindles together with their mounting 30 are inclined to the horizontal at an angle β here amounting to roughly half the tilt angle α of the turntable, the parisons impelled by the counterrotating spindles 31, 32 slide under their own weight toward turntable 1 to be successively received by respective recesses 4. A fixed guide in the form of a short C-profile 58, rigid with base 29 and similar in cross-section to guide channels 9, extends from the downstream ends of spindles 31, 32 to the loading station 6 for guiding the oncoming parisons to the raised edge of the tilted turntable 1. In the event of a workpiece backup from the guide 58 along spindles 31, 32, a monitoring photosensor 59 located adjacent the feed track on base 29 temporarily stops the motor 50.

Having been entrained by turntable 1 from loading station 6 to unloading station 8, their flanges 57 resting on the upper surface of the turntable, four parisons are retained in their lodgments 4 by barrier 12 as the drive motor 2 is stopped. A signal from switch 21 then activates the valve 18 to pressurize the jack 13 via hose 16. The barrier plate is thus raised, allowing air jets from nozzles 28 to propel the parisons down the channels 9 to the guiding tracks 20 of blow-molding unit 19. After a brief interval, measured by a nonillustrated timer, valve 18 is automatically activated to reverse the jack 13 via hose 17, thus restoring barrier 12 to its blocking position. Thereafter, turntable 1 is stepped four more times by motor 2 to move the next four parisons to the unloading station 8 while simultaneously accepting as many fresh parisons at loading station 6 from feeder 43, 41, 31, 32. The next transfer cycle begins with the reactivation of valve 18 by a readiness signal from the blow-molding unit 19 equipped with the usual heating and stretching means.

The halting of turntable motor 2 after every four-step transport cycle and the restarting of the cycle upon the withdrawal and restoration of barrier 12, in response to a readiness signal from blow molder 19, is controlled by the aforementioned timer including, for example, a four-stage pulse counter stepped by pulses from a relay connected in parallel with the motor.

Figure 5:
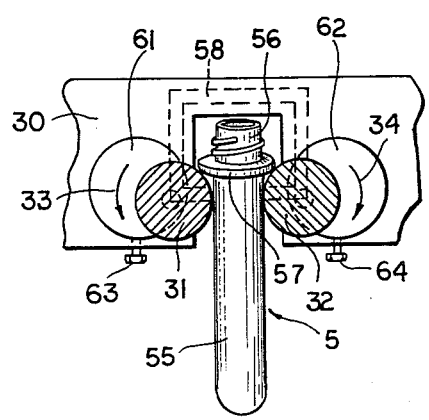
FIGS. 4 and 5 are fragmentary cross-sectional views, drawn to a larger scale, respectively taken on lines IV—IV and V—V of FIG. 1.

As illustrated in FIG. 5, spindles 31, 32 have gudgeons eccentrically journaled in bushings 61, 62 which are rotatable in cutouts of mounting frame 30 to facilitate adjustment of the gap width according to the thickness of the workpieces 5 to be conveyed. The bushings 61, 62 are immobilizable in their cutouts by setscrews 63, 64. Naturally, any significant change in gap width is to be accompanied by a similar adjustment of the width of the slots 10 of guide channels 9.

We claim:

1. A machine for distributing groups of workpieces among different destinations, said workpieces having elongate stems topped by enlarged heads, comprising:

a turntable inclined at an acute angle to the horizontal and provided with a multiplicity of peripheral recesses each adapted to receive one of said workpieces;

drive means for intermittently rotating said turntable to align said recesses successively with a loading point confronting an elevated edge of said turntable and with a plurality of unloading points confronting a depressed edge of said turntable;

feed means terminating at said loading point for emplacing a series of workpieces in a generally upright position, suspended by their heads from the upper turntable surface, in recesses successively aligned therewith;

a guard rail paralleling the periphery of said turntable between said loading point and said unloading points for retaining said workpieces in said recesses;

a plurality of guide channels for the heads of said workpieces, said guide channels being provided with head-supporting surfaces lying substantially in the plane of said turntable and extending from said unloading points to respective destinations of workpieces entrained by said turntable from said loading point; and discharge means operatively linked with said drive means for concurrently transferring a plurality of workpieces, received in recesses halted at said unloading points, to the corresponding guide channels for conveyance to their destinations, said discharge means including an arcuate barrier forming a continuation of said guard rail between said turntable and said guide channels, pneumatic actuating means connected to a source of compressed air for temporarily withdrawing said barrier upon a halting of said turntable in a position of alignment of a workpiece-holding recess with each of said guide channels, and a set of nozzles connected to said source of compressed air for driving the workpieces from said recesses into said guide channels.

2. A machine as defined in claim 1 wherein said acute angle ranges between substantially 15° and 20°.

3. A machine as defined in claim 1 wherein said feed means comprises a pair of parallel, inclined members with an intervening gap forming a sloping track between a raised upstream end and said loading point, the stems of said workpieces being narrower than said gap whereby each workpiece comes to rest on said members by its head while hanging down into the gap.

4. A machine as defined in claim 3, further comprising a storage bin below said upstream end, elevator means rising from said bin above said upstream end for lifting successive workpieces out of said bin onto said members, and hopper means adjoining said elevator means for directing oncoming workpieces at said upstream end toward said gap.

5. A machine as defined in claim 3 wherein said guide channels are formed by tubular profiles with bottom slots having substantially the same width as said gap for accommodating said stems.

6. A machine as defined in claim 3, further comprising monitoring means at an intermediate point of said track operatively coupled with said elevator means for arresting same upon sensing a backup of workpieces on said members.

7. A machine as defined in claim 3 wherein said members are counterrotating spindles with rising sides bounding said gap, said spindles being inclined to the horizontal at approximately half said acute angle.

* * * * *